(12) United States Patent
Concha

(10) Patent No.: US 11,414,218 B1
(45) Date of Patent: Aug. 16, 2022

(54) SYSTEM FOR MAINTAINING SATELLITES IN ORBITAL CONFIGURATION

(71) Applicant: AMAZON TECHNOLOGIES, INC., Seattle, WA (US)

(72) Inventor: Marco Concha, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 233 days.

(21) Appl. No.: 16/891,932

(22) Filed: Jun. 3, 2020

(51) Int. Cl.
    *B64G 1/24* (2006.01)
    *B64G 1/10* (2006.01)
    *B64G 1/36* (2006.01)

(52) U.S. Cl.
    CPC .......... *B64G 1/242* (2013.01); *B64G 1/1085* (2013.01); *B64G 1/36* (2013.01)

(58) Field of Classification Search
    CPC ......... B64G 1/242; B64G 1/1085; B64G 1/36
    See application file for complete search history.

(56) References Cited

U.S. PATENT DOCUMENTS

| | | | | |
|---|---|---|---|---|
| 5,813,634 A * | 9/1998 | Pizzicaroli | ......... | H04B 7/18519 455/12.1 |
| 5,906,337 A * | 5/1999 | Williams | ............. | B64G 1/1085 455/13.1 |
| 5,979,832 A * | 11/1999 | Draim | ..................... | B64G 1/242 455/12.1 |
| 9,647,749 B2 * | 5/2017 | Krebs | ...................... | H04B 7/19 |
| 2018/0022474 A1 * | 1/2018 | Meek | ................... | B64G 1/1007 244/158.4 |
| 2018/0155065 A1 * | 6/2018 | Silva | ...................... | B64G 1/242 |
| 2022/0081132 A1 * | 3/2022 | Mukae | .................. | B64G 1/242 |

OTHER PUBLICATIONS

"Frozen Orbit Design", Orbital Mechanics with Numerit, 2 pages.
Ahmed, Kamran, "Orbital Mechanic", Lecture #4, 5 pages. Retrieved from the Internet: http://www.rfcafe.com/references/articles/Satellite-Comm-Lectures/Satellite-Comms-Orbital-Mech.pdf.
Amstat, "Keplerian Elements Tutorial", 2020, 10 Pages, Retrieved from the Internet: https://www.amsat.org/keplerian-elements-tutorial/.

(Continued)

*Primary Examiner* — Brian M O'Hara
(74) *Attorney, Agent, or Firm* — Lindauer Law, PLLC

(57) ABSTRACT

A constellation of many satellites are actively maneuvered to maintain specified non-geosynchronous reference orbits. Each satellite is assigned a slot within a particular reference orbit. For each reference orbit, a set of orbital parameters including eccentricity and argument of perigee for frozen orbits are selected that are unique relative to other reference orbits in use. One characteristic of a frozen orbit is that at a given point in the orbit, altitude is relatively constant. At points where orbital planes of the reference orbits intersect, the differing sets of orbital parameters assure a vertical separation between satellites in different orbital planes is maintained without the need for evasive maneuvers. Actual orbital motion data is obtained from sensors onboard each satellite. The desired orbital parameters are maintained based on the actual orbital motion data as part of scheduled maneuvers to maintain the reference orbit assigned to that satellite.

20 Claims, 6 Drawing Sheets

(56) References Cited

OTHER PUBLICATIONS

Emma, Brian P., "Autonomous longitude and eccentricity control of geostationary spacecraft," (2002), Master's Theses, 2356, San Jose University, 59 pages. Retrieved from the Internet: https://doi.org/10.31979/etd.vgbe-yv5a.
Jones, S. L., "Negating the Yearly Eccentricity Magnitude Variation of Super-synchronous Disposal Orbits due to Solar Radiation Pressure", 2013, 79 pages.
Pardal, et al., "Study of Orbital Elements on The Neighbourhood of a Frozen Orbit," Journal of Aerospace Engineering, Sciences and Applications, May-Aug. 2008, vol. I, No. 2., 10 pages. Retrieved from the internet:https://web.archive.org/web/20101129002858/http://www.aeroespacial.org.br/jaesa/editions/repository/v01/n02/3-PardalEtal.pdf.
Reiland, et al., "Assessing and Minimizing Collisions in Satellite Mega-Constellations", 2020, 32 pages. Retrieved from the Internet: https://arxiv.org/abs/2002.00430.
Springer, et al., "Mathematical Models and Algorithms", European Space Agency, 2009,150 pages. Retrieved from the Internet: http://hpiers.obspm.fr/combinaison/documentation/articles/NAPEOS_MathModels_Algorithms.pdf.
Sweetser, et al., "The Eccentric Behavior of Nearly Frozen Orbits", California Institute of Technology, 2013, 13 pages. Retrieved from the Internet: https://trs.jpl.nasa.gov/bitstream/handle/2014/44434/13-3287_A1b.pdf? sequence=1 &isAllowed=y.

\* cited by examiner

SYSTEM FOR MAINTAINING SATELLITES IN ORBITAL CONFIGURATION

BACKGROUND

Satellites in non-geosynchronous orbits (NGO) move relative to a body they are orbiting, such as the Earth. Satellites in NGOs provide several advantages compared to geosynchronous orbits, including reduced latency, shorter communication path lengths, and so forth. Devices using an NGO satellite for communication may also be moving relative to the Earth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
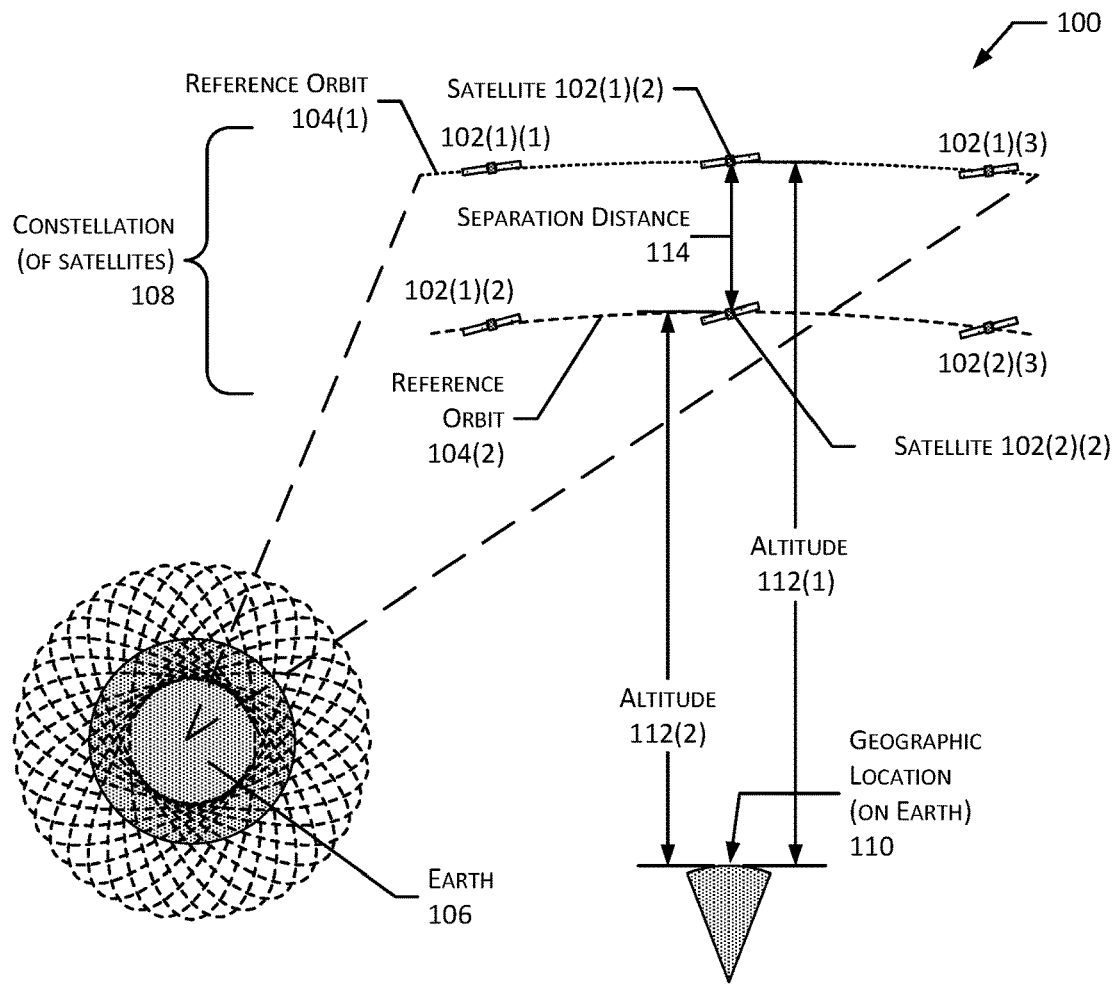
FIG. 1 illustrates a system for establishing and maintaining an orbital configuration for a constellation of satellites that avoids endogenous collisions, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Non-geosynchronous orbit (NGO) satellites move relative to a body such as the Earth, Moon, Mars, and so forth. Satellites in NGOs may be part of a network to provide communication service between devices, such as user terminals (UT) located on or near the body. For example, a first UT on a first location on the Earth may send user data to a first satellite that is in range of the first UT. The first satellite may send the user data to a ground station, another satellite, and so forth. Likewise, data destined for the first UT may be sent by the ground station to the first satellite, which then sends the data to the first UT. For ease of illustration, and not necessarily as a limitation, a satellite may be deemed "in range" of a UT when communication may take place. For example, a satellite may be in range when it is within line of sight of the UT, a distance between the satellite and the UT is less than a threshold distance, the UT is within a footprint of an antenna onboard the satellite, and so forth.

A period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite may be in range of a particular UT for only a few minutes. In comparison, a geosynchronous satellite has an orbital period that coincides with the rotation of the Earth, so a geosynchronous satellite appears to remain motionless with respect to the Earth.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth may also be present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving an NGO satellite at an altitude of 600 km only introduces about 4 ms of latency. As a result, compared to using geosynchronous satellites, the use of NGO satellites significantly reduces latencies due to signal travel times.

Several factors limit the use, number, and placement of geosynchronous satellites. Orbital dynamics, fuel consumption required to keep a satellite in a particular orbit, radio propagation characteristics, and so forth result in a finite number of geosynchronous orbital "slots". Given these limitations and the increasing demand for communication services, geosynchronous satellites are unable to satisfy the increasing demands of communication services.

Using a constellation of many NGO satellites offers significant benefits. Latency is dramatically reduced, improving usefulness for communication. Shorter distances between the UT and the satellite allows for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

While a constellation of many NGO satellites provides various operational benefits, careful consideration must be given to the arrangement of the orbits relative to one another to avoid collisions between the satellites in the constellation with one another, as well as with other satellites or debris. An "endogenous collision" is when two or more satellites in the same constellation collide. Traditionally, the risks of endogenous collision have been either non-existent due to relatively small constellations, or have been mitigated in these small constellations by coordinating the spacing or timing of motion in orbit. For example, in a small constellation of approximately 70 satellites distributed across six different orbital planes it is comparatively simple to avoid endogenous collision by adjusting the orbital parameters such as time of perigee passing for the satellites in a given orbital plane.

Sparse constellations also tolerate the changes to an orbit produced by various factors such as drag, gravitational perturbations, solar pressure, and so forth. For example, even at altitudes of hundreds of kilometers, some traces of Earth's atmosphere are still present, producing drag on a satellite. This drag retards the motion of the satellite, changing its orbit. Gravitational perturbations may also change the orbit of a satellite. Gravitational perturbations result from the variation in the shape and distribution of mass of the Earth, the sun's gravity, the Moon's gravity, and so forth. In a sparse constellation, the position of an individual satellite is less critical. For example, errors in an orbit may be allowed to accumulate for some time before the satellite is maneuvered to restore a desired orbit.

A satellite may be maneuvered to compensate for the factors that influence orbit, to avoid collision, or for other purposes. Maneuvering a satellite to change its velocity may consume onboard propellant, which is finite. Once propellant is exhausted, the satellite loses the ability to maneuver. Without the ability to maneuver, the satellite must be decommissioned. Ideally, before the propellant is exhausted, the satellite is deorbited or moved to a graveyard orbit to minimize the quantity of debris in orbit.

Endogenous collision mitigation in sparse satellite constellations is somewhat adequate using techniques such as a handful of orbital planes, large spacing between satellites, wide tolerance for accumulated errors in position within an orbit, and so forth. However, as constellations grow larger such techniques become infeasible. For example, the use of more orbital planes and conventional orbital configurations increases the number of intersecting orbits, increasing the risk of endogenous collision. Increasing the number of satellites in a given orbital configuration decreases the spacing between satellites and increases the likelihood of collision. Reducing the tolerance for errors in position in orbit also increases the frequency of maneuvering to maintain the tighter tolerance.

Described in this disclosure are techniques and systems for maintaining satellites in an orbital configuration in which endogenous collision risk is substantially reduced by introducing an inherent altitude separation. A set of reference orbits are defined, each reference orbit comprising a plurality of orbital parameters. Each reference orbit may be based on a "frozen orbit". A frozen orbit takes into consideration various perturbations so that eccentricity and argument of perigee of the orbit do not change over longer spans of time. One characteristic of a frozen orbit is that the altitude of the orbit over a particular location on Earth is relatively constant. For example, a satellite in a frozen orbit that passes over Seattle would be at about the same height above Seattle with each pass.

Once a frozen orbit has been determined, a set of reference orbits may be specified. Within the set of all reference orbits, each individual reference orbit contains a unique combination of orbital parameters such as eccentricity, argument of perigee, and right ascension of the ascending node (RAAN). Because each reference orbit has a unique combination of these orbital parameters, the altitude of each reference orbit above a given geographic location will differ. Because each reference orbit is based on a frozen orbit, that altitude will be relatively consistent between passes, resulting in an inherent separation distance between reference orbits.

Dense constellations, such as those including more than 100 satellites, may use these reference orbits to produce an inherent mitigation of endogenous collision risk. Because the reference orbits may differ slightly from the idealized frozen orbit, the satellites will experience some perturbation, and so will be maneuvered to maintain the desired reference orbit and relative position with respect to other satellites in the same reference orbit. Maneuvers to compensate for drag, solar pressure, and so forth may be combined with maneuvers to maintain the desired reference orbit. This combination results in significant reductions in propellent consumption compared to discrete maneuvers, while also reducing the complexity of scheduling such maneuvers. Additionally, because the references orbits are substantially stable and inherently non-intersecting due to the altitude differences, the endogenous collision risk is still mitigated in the event of a temporary failure of a satellite to maneuver or an incomplete maneuver. Furthermore, by maintaining the orbital configurations described herein, the need for satellites in the constellation to actively maneuver to avoid endogenous collisions is substantially reduced or eliminated altogether. As a result, the orbital configuration of the constellation results in a high level of inherent safety with regard to endogenous collisions.

To facilitate these maneuvers, each satellite includes one or more sensors. These sensors are used to determine position data of that satellite. For example, the sensors may include a global navigation satellite system (GNSS) receiver such as a Global Position System (GPS) receiver that provides position data such as the coordinates of the satellite, relative to Earth, at particular times. This highly precise position data allows for actual orbital parameters to be determined. Once the actual orbital parameters are known, corresponding maneuvering vectors may be determined to restore the satellite to the desired reference orbit. The maneuvering vectors may then be used to determine maneuvering instructions that operate the satellite to move.

Once reference orbits have been specified, many satellites may be deployed in each reference orbit. For example, multiple satellites may be arranged in a single reference orbit having the same set of orbital parameters differing only by a time of perigee passage. In one implementation, 36 reference orbits may be defined, with 90 satellites in each reference orbit, for a total constellation size of 3,240 satellites in the constellation. By using the techniques and systems to maintain the orbital configurations described in this disclosure, the risk of collision between those satellites is substantially reduced or eliminated altogether.

The system and techniques described in this disclosure makes possible a dense constellation of NGO satellites in which there is inherent mitigation of endogenous collision. As a result, the risk of endogenous collision is substantially reduced or eliminated. Overall reliability of the constellation is improved by this reduction in risk. The risk of debris generation due to endogenous collisions is also substantially reduced or eliminated.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication service. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period or time it takes for a satellite to complete a single orbit. A satellite in a geosynchronous orbit at an altitude of 35,800 km may appear to be fixed with respect to the ground because of the period that the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication service also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality of satellites 102(1), 102(2), . . . , 102(S). Each satellite 102 is in a reference orbit 104 relative to Earth 106. Satellites 102 in the same reference orbit 104 may be separated from one another by some distance along the orbital path, as shown here. The reference orbits 104 may be non-geosynchronous orbits (NGOs). The plurality of satellites 102 form a constellation 108. The constellation 108 may comprise hundreds or thousands of satellites 102. In this notation, the first number in parentheses indicates the reference orbit 104, and the second number in parentheses indicates a particular satellite 102 in that reference orbit 104. For example, satellite 102(1)(1) is the first satellite 102 in the first reference orbit 104(1).

Each satellite 102 may pass over a geographic location 110 on Earth 106 at some altitude 112. By using the techniques described in this disclosure, satellites 102 in different reference orbits 104 that pass over the same geographic location 110 would do so at different altitudes 112, resulting in a separation distance 114 between those reference orbits 104. For example, the first reference orbit 104(1) may pass above the geographic location 110 at a first altitude 112(1) that is greater than the second altitude 112(2) of the second reference orbit 104(2). The altitude 112 of an orbit may be measured either in terms of a radius from the center of the Earth 106, or alternatively as a height above ground for a fixed feature. For example, the altitude 112 may be relative to the geodetic center of the Earth 106, the spherical center of the Earth 106, and so forth.

As the number of reference orbits 104 increase, so too do the number of possible intersections between those orbits. For example, at higher latitudes of 75 degrees or more, the incidence of intersections between orbits substantially increases. The reference orbits 104 may thus be configured to provide the separation distance 114 at or above these higher latitudes.

Each reference orbit 104 is associated with a particular set of orbital parameters 120. Each set comprises orbital parameters 122 and corresponding values 124 that define the orbit relative to the Earth 106. These orbital parameters 122 may include eccentricity (e), argument of perigee (w), right ascension of the ascending node (RAAN) (0) and so forth. The orbital parameters 122 are discussed in more detail with regard to FIG. 2.

The position of each satellite 102 within a particular reference orbit 104 may be specified by a time of perigee passage 126 (to), also known as an epoch time. For example, the time of perigee passage 126 may be designated as a time, relative to a defined initial time, at which a particular satellite 102 is located at the perigee of its orbit.

An orbital mechanics system (see FIG. 4) may be used to determine the set of orbital parameters 120 that describe the various reference orbits 104. Each of the set of orbital parameters 120 associated with each reference orbit 104 are configured such that the combination of values 124 of those orbital parameters 122 are unique relative to the other reference orbits 104. For example, the first set of orbital parameters 120(1) and the second set of orbital parameters 120(2) have different values 124 of eccentricity and RAAN. This difference results in a separation distance 114 at the geographic location 110.

To determine the set of orbital parameters 120 that describes a reference orbit 104, an initial frozen orbit is determined. The frozen orbit balances the geopotential forces so that the geometry of the orbit remains (relatively) constant in altitude over a given latitude of the Earth 106. A satellite 102 in orbit around Earth 106 is subject to various perturbations resulting from the variations in the shape and mass distribution of Earth 106, drag, solar pressure, and so forth. By taking these perturbations into consideration, a frozen orbit may be determined in which at least some of these perturbations cancel one another out. The determination of a frozen orbit is well known. (See P.C. Pardal, et al, "Study of Orbital Elements on the Neighbourhood of a Frozen Orbit", Journal of Aerospace Engineering, Sciences and Applications, May-August 2008, Vol. I, No. 2.)

A reference orbit 104 and the associated set of orbital parameters 120 is determined by modifying one or more values 124 of the orbital parameters 122 associated with the frozen orbit. In one implementation, the orbital mechanics system may use the set of orbital parameters 120 representative of the frozen orbit as an input and may iterate through many possible variations of one or more values 124 of the orbital parameters 122 to determine two or more reference orbits 104 in which the separation distance 114 is within a specified range. For example, if the second reference orbit 104(2) differs from the first reference orbit 104(1) in eccentricity of 0.00015 and RAAN of 12.85, the minimum separation distance 114 for a 590 km orbit would be 1.04 km. That is, the point of closest approach between these two orbits would have a vertical separation distance 114 of at least approximately 1 km.

Figure 2:
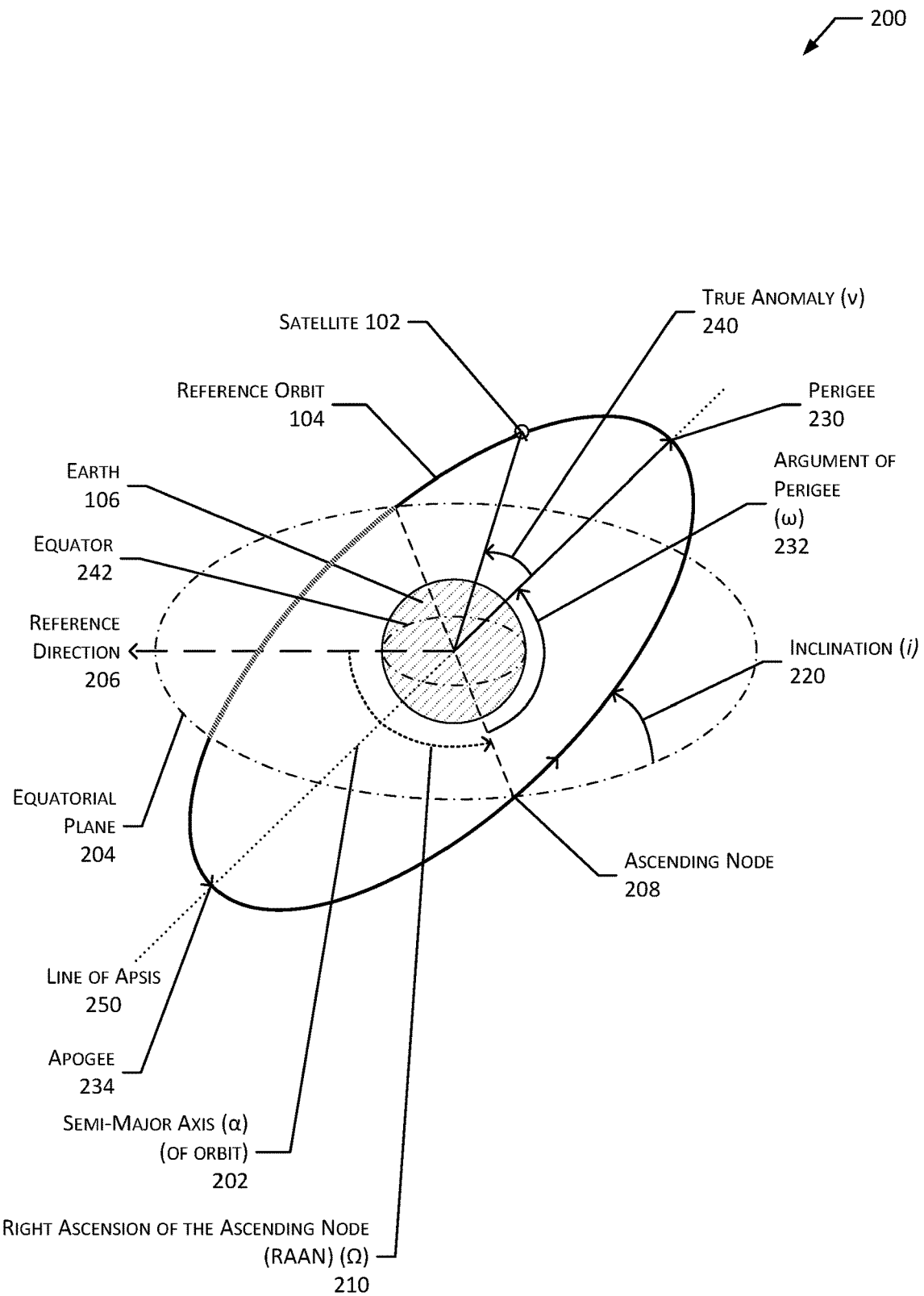
FIG. 2 illustrates orbital parameters associated with a satellite.

FIG. 2 illustrates at 200 orbital parameters 122 associated with a reference orbit 104 of the satellite 102. The reference orbit 104 defines an orbital plane. The reference orbit 104 has a semi-major axis (α) (sma) 202. The semi-major axis 202 may represent one half the sum of the distance from the center of the Earth 106 to the perigee 230 and the apogee 234 of the reference orbit 104. In some implementations, such as when eccentricity is relatively small, the semi-major axis 202 may be determined as the radius of the Earth 106 plus a desired altitude 112.

The perigee 230 (or more generally periapsis) is the point of closest approach of the reference orbit 104 to the Earth 106. The apogee 234 is the point of farthest distance of the reference orbit 104 to the Earth 106. A line of apsis 250 extends through the apogee 234, the Earth 106, and the perigee 230.

An equatorial plane 204 of the Earth 106 is shown. A reference direction 206 for the equatorial plane 204 may be specified. For example, the reference direction 206 may comprise, relative to Earth 106, a direction of the vernal equinox also known as the first point of Aries that specifies a line towards the constellation Aries that is along the intersection of the celestial equator that intersects the ecliptic.

An equator 242 of the Earth 106 is also shown. In some implementations the equatorial plane 204 may be specified with respect to the equator 242.

An inclination (i) 220 is indicative of the angle between the equatorial plane 204 and the orbital plane, as measured along a line that is perpendicular to a line of intersection between the reference orbit 104 and the equatorial plane 204.

An ascending node 220 is shown. The ascending node 220 is the point at which the reference orbit 104 passes upwards through the equatorial plane 204.

A right ascension of the ascending node (RAAN) (0) 210 is shown. The RAAN 210 may also be known as the longitude of the ascending node. The RAAN 210 represents the angle in the equatorial plane 204 between the reference direction 206 and the ascending node 208.

An argument of perigee (w) 232 is indicative of the angle, in the orbital plane, from the intersection of the equatorial plane 204 and the orbital plane to the line extending from the Earth 106 to the point of perigee 230.

A true anomaly (v) 240 describes the angle between the perigee 230 and a position of the satellite 102 at a specified time.

Figure 3:
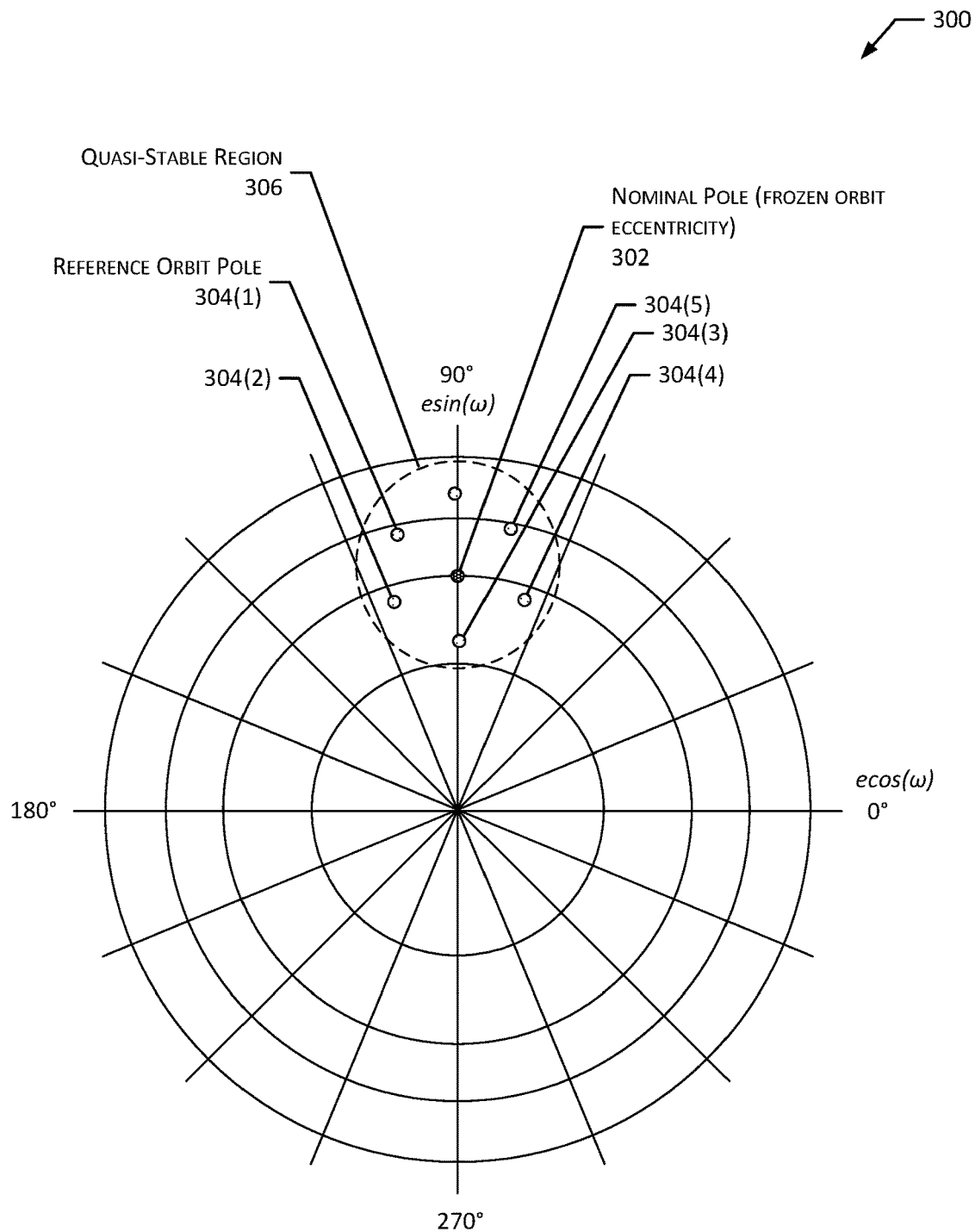
FIG. 3 illustrates a polar plot of eccentricity magnitude of reference orbits compared to a frozen orbit, according to some implementations.

FIG. 3 illustrates a polar plot 300 of eccentricity poles of reference orbits 104 compared to a nominal pole of a frozen orbit, according to some implementations. This plot shows the argument of perigee (w) 232 for various orbits with their associated eccentricity magnitude. For a given orbit, the eccentricity magnitude may comprise the magnitude of an eccentricity vector. The eccentricity vector is a dimensionless vector with a direction pointing from apogee 234 to perigee 230 and having an eccentricity magnitude equal to the scalar eccentricity.

A nominal pole 302 corresponding to the eccentricity of the frozen orbit is shown. Also shown are reference orbit poles 304(1), 304(2), ..., 304(5) corresponding to reference orbits 104. The reference orbit poles 304 are within a quasi-stable region 306. In one implementation, the quasi-stable region 306 may be determined based on the available capabilities of the maneuvering system 426 of the satellite 102. In some implementations, the set of orbital parameters 120 associated with each reference orbit 104 may be based at least in part on the capabilities of the maneuvering system 426. For example, the quasi-stable region 306 may comprise orbital parameters 122, such as eccentricity, that can be maintained using less than a specified quantity of propellant over an expected lifespan of the satellite 102. In another example, the quasi-stable region 306 may comprise orbital parameters 122 that can be maintained within the constraints of available propulsion capabilities of the satellite 102 and available times for maneuvering. Continuing the example, the satellite 102 may be unable to provide communication services to user terminals 408 while maneuvering. As a result, maneuvers may be limited to certain portions of the reference orbit 104 to avoid disrupting those services. As a result, the quasi-stable region 306 may be constrained based on where within the reference orbit 104 maneuvers are permitted as well as the capabilities of the maneuvering system 426 to change the motion of the satellite 102.

Reference orbits 104 corresponding to reference orbit poles 304 outside of the quasi-stable region 306 may still be used, but may consume greater quantities of propellant in order to counteract perturbing influences and maintain the desired reference orbit 104. In one implementation, the nominal pole 302 may have an eccentricity of between 0.0005 and 0.0008 at an argument of perigee (w) 232 of 90 degrees (0.5n).

In other implementations other orbital configurations may be used. For example, the nominal pole 302 may be designated for an orbit that is not a frozen orbit. In this implementation, the quasi-stable region 306 is determined by the available capabilities of the maneuvering system of the satellite 102 as well as the expected perturbations. The orbital parameters 122 may be varied as described herein to produce a separation distance 114 between reference orbits 104 that are not associated with a frozen orbit.

Figure 4:
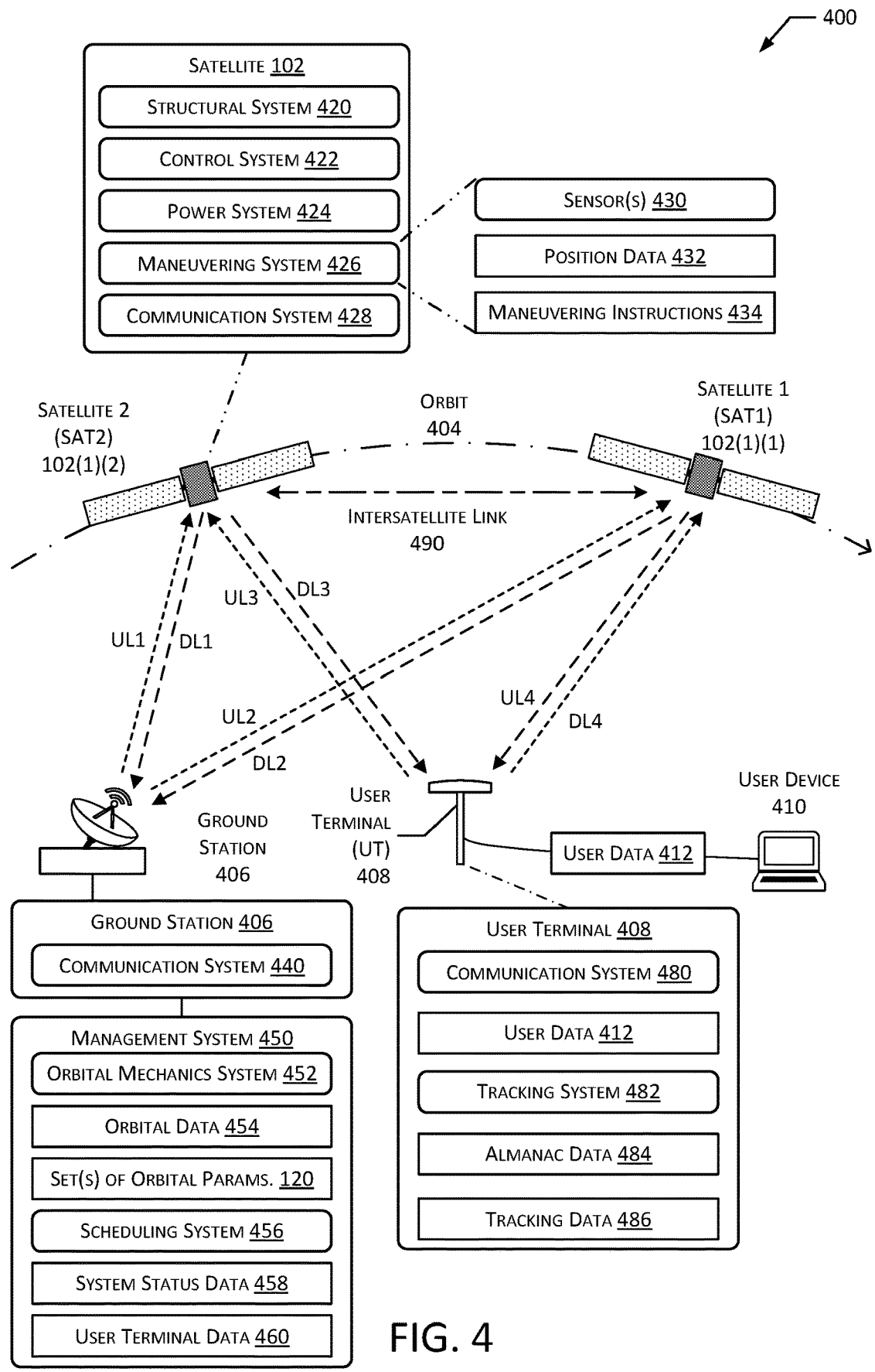
FIG. 4 illustrates systems associated with the constellation, according to some implementations.

FIG. 4 illustrates systems 400 associated with the constellation 108, according to some implementations.

The satellite 102 may comprise a structural system 420, a control system 422, a power system 424, a maneuvering system 426, and a communication system 428. In other implementations, some systems may be omitted or other systems added. One or more of these systems may be communicatively coupled with one another in various combinations. These systems are described in more detail with regard to FIG. 5.

The maneuvering system 426 maintains the satellite 102 in one or more of a specified orientation or orbit 404, such as a reference orbit 104. For example, the maneuvering system 426 may stabilize the satellite 102 with respect to one or more axes. In another example, the maneuvering system 426 may move the satellite 102 to a specified orbit 404. The maneuvering system 426 may include one or more computing devices, thrusters, momentum wheels, solar sails, drag devices, and so forth. The maneuvering system 426 may use data from one or more sensors 430 during operation. The sensors 430 are discussed in more detail with regard to FIG. 5.

The maneuvering system 426 may use the sensors 430 to determine position data 432. The position data 432 may comprise information such as spatial and time coordinates that indicate the position of the satellite 102. For example, during operation the GNSS receiver may generate position data 432 comprising a time series of latitude, longitude, altitude, and time. The position data 432 may be used to calculate actual orbital parameters 122 for the satellite 102. Once the actual orbit 404 is determined, the maneuvering system 426 may determine one or more maneuvering vectors that, if executed, would move the satellite 102 to within a threshold variation of the reference orbit 104. The maneuvering vectors may be used to determine maneuvering instructions 434 that specify various parameters, such as a maneuver start time, maneuver end time, orientation of the satellite 102 during the maneuver, duration of thrust, and so forth. The maneuvering system 426 may then execute the maneuvering instructions 434 to move the satellite 102.

In some implementations, one or more of these operations may be performed by the orbital mechanics system 452. For example, the satellite 102 may send the position data 432 to the orbital mechanicals system 452 that then determines the maneuvering instructions 434. The maneuvering instructions 434 may then be sent to the satellite 102 via the ground station 406. The maneuvering system 426 onboard the satellite 102 may execute the maneuvering instructions 434.

The communication system 428 provides communication with one or more other devices, such as other satellites 102, ground stations 406, user terminals 408, and so forth. The communication system 428 may include one or more modems, digital signal processors, power amplifiers, antennas (including at least one antenna that implements multiple antenna elements, such as a phased array antenna), processors, memories, storage devices, communications peripherals, interface buses, and so forth. Such components support communications with other satellites 102, ground stations 406, user terminals 408, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 428 may be output to other systems, such as to the control system 422, for further processing. Output from a system, such as the control system 422, may be provided to the communication system 428 for transmission.

One or more ground stations 406 are in communication with one or more satellites 102. The ground stations 406 may pass data between the satellites 102 and a management system 450, networks such as the Internet, and so forth. The ground stations 406 may be emplaced on land, on vehicles, at sea, and so forth. Each ground station 406 may comprise a communication system 440. Each ground station 406 may use the communication system 440 to establish communication with one or more satellites 102, other ground stations 406, and so forth. The ground station 406 may also be connected to one or more communication networks. For example, the ground station 406 may connect to a terrestrial fiber optic communication network. The ground station 406 may act as a network gateway, passing user data 412 or other data between the one or more communication networks and the satellites 102. Such data may be processed by the ground station 406 and communicated via the communication system 440. The communication system 440 of a ground station 406 may include components similar to those of the communication system 428 of a satellite 102 and may perform similar communication functionalities. For example, the communication system 440 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 406 are in communication with a management system 450. The management system 450 is also in communication, via the ground stations 406, with the satellites 102 and the UTs 408. The management system 450 coordinates operation of the satellites 102, ground stations 406, UTs 408, and other resources of the system 400. The management system 450 may comprise one or more of an orbital mechanics system 452 or a scheduling subsystem 456.

The orbital mechanics system 452 may determine orbital data 454 that is indicative of a state of a particular satellite 102 at a specified time. In one implementation, the orbital mechanics system 452 may use the set of orbital parameters 120 associated with the satellites 102 in the constellation 108 to determine the orbital data 454 that predicts location, velocity, and so forth of particular satellites 102 at particular times or time intervals. In some implementations, the orbital mechanics system 452 may use data obtained from actual observations from tracking stations, the position data 432 received from the satellite 102, scheduled maneuvers, and so forth to determine the orbital data 454. The orbital mechanics system 452 may also consider other data, such as space weather, collision mitigation, orbital elements of known debris, and so forth to determine the orbital data 454.

The orbital mechanics system 452 may use the position data 432 to determine the maneuvering instructions 434. For example, the orbital mechanics system 452 may use the position data 432 acquired by a satellite 102 to determine actual orbital parameters of the satellite 102. The set of orbital parameters 120 that represent the reference orbit 104 that is associated with the satellite 102 may be retrieved. Based on the difference between the actual orbital parameters and the specified set of orbital parameters 120, one or more maneuvers may be planned to place the satellite 102 within a threshold value of the reference orbit 104.

The scheduling system 456 schedules resources to provide communication to the UTs 408. For example, the scheduling system 456 may determine handover data that indicates when communication is to be transferred from the first satellite 102(1) to the second satellite 102(2). Continuing the example, the scheduling system 456 may also specify communication parameters such as frequency, timeslot, and so forth. During operation, the scheduling system 456 may use information such as the orbital data 454, system status data 458, user terminal data 460, and so forth.

The system status data 458 may comprise information such as which UTs 408 are currently transferring data, satellite availability, current satellites 102 in use by respective UTs 408, capacity available at particular ground stations 406, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 458 may be indicative of past status, predictions of future status, and so forth. For example, the system status data 458 may include information such as projected data traffic for a specified interval of time based on previous transfers of user data 412. In another example, the system status data 458 may be indicative of future status, such as a satellite 102 being unavailable to provide communication service due to scheduled maneuvering, scheduled maintenance, scheduled decommissioning, and so forth.

The user terminal data 460 may comprise information such as a location of a particular UT 408. The user terminal data 460 may also include other information such as a priority assigned to user data 412 associated with that UT 408, information about the communication capabilities of that particular UT 408, and so forth. For example, a particular UT 408 in use by a business may be assigned a higher priority relative to a UT 408 operated in a residential setting. Over time, different versions of UTs 408 may be deployed, having different communication capabilities such as being able to operate at particular frequencies, supporting different signal encoding schemes, having different antenna configurations, and so forth.

The UT 408 includes a communication system 480 to establish communication with one or more satellites 102. The communication system 480 of the UT 408 may include components similar to those of the communication system 428 of a satellite 102 and may perform similar communication functionalities. For example, the communication system 480 may include one or more modems, digital signal processors, power amplifiers, antennas (including at least one antenna that implements multiple antenna elements, such as a phased array antenna), processors, memories, storage devices, communications peripherals, interface buses, and so forth. The UT 408 passes user data 412 between the constellation 108 of satellites 102 and the user device 410. The user data 412 includes data originated by the user device 410 or addressed to the user device 410. The UT 408 may be fixed or in motion. For example, the UT 408 may be used at a residence, or on a vehicle such as a car, boat, aerostat, drone, airplane, and so forth.

The UT 408 includes a tracking system 482. The tracking system 482 uses almanac data 484 to determine tracking data 486. The almanac data 484 provides information indicative of orbital elements of the orbit 404 of one or more satellites 102. For example, the almanac data 484 may comprise orbital elements such as "two-line element" data for the satellites 102 in the constellation that are broadcast or otherwise sent to the UTs 408 using the communication system 480.

The tracking system 482 may use the current location of the UT 408 and the almanac data 484 to determine the tracking data 486 for the satellite 102. For example, based on the current location of the UT 408 and the predicted position and movement of the satellites 102, the tracking system 482 is able to calculate the tracking data 486. The tracking data 486 may include information indicative of azimuth, elevation, distance to the second satellite 102(2), time of flight correction, or other information at a specified time. The determination of the tracking data 486 may be ongoing. For example, the first UT 408 may determine tracking data 486 every 400 ms, every second, every five seconds, or at other intervals.

With regard to FIG. 4, an uplink is a communication link which allows data to be sent to a satellite 102 from a ground station 406, UT 408, or device other than another satellite 102. Uplinks are designated as UL1, UL2, UL3 and so forth. For example, UL1 is a first uplink from the ground station 406 to the second satellite 102(1)(2). In comparison, a downlink is a communication link which allows data to be sent from the satellite 102 to a ground station 406, UT 408, or device other than another satellite 102. For example, DL1 is a first downlink from the second satellite 102(1)(2) to the ground station 406. The satellites 102 may also be in communication with one another. For example, an intersatellite link 490 provides for communication between satellites 102 in the constellation.

The satellite 102, the ground station 406, the user terminal 408, the user device 410, the management system 450, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth.

Figure 5:
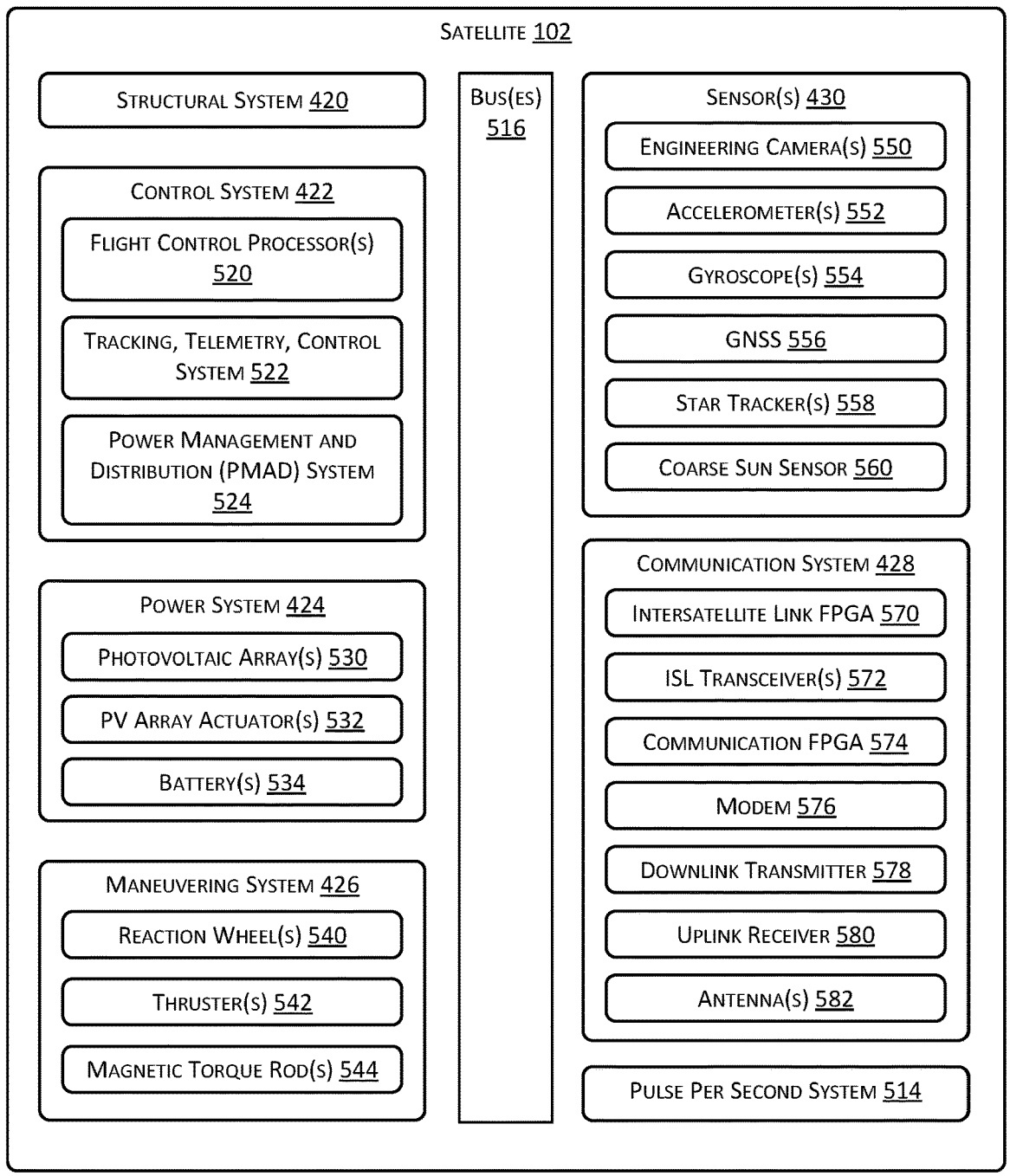
FIG. 5 is a block diagram of some systems associated with the satellite, according to some implementations.

FIG. 5 is a block diagram of some systems associated with the satellite 102, according to some implementations. The satellite 102 may comprise the structural system 420, the control system 422, the power system 424, the maneuvering system 426, one or more sensors 430, and the communication system 428. A pulse per second (PPS) system 514 may be used to provide timing reference to the systems onboard the satellite 102. One or more busses 516 may be used to transfer data between the systems onboard the satellite 102. In some implementations, redundant busses 516 may be provided. The busses 516 may include, but are not limited to, data busses such as Controller Area Network Flexible Data Rate (CAN FD), Ethernet, Serial Peripheral Interface (SPI), and so forth. In some implementations the busses 516 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 420 comprises one or more structural elements to support operation of the satellite 102. For example, the structural system 420 may include trusses, struts, panels, and so forth. The components of other systems may be affixed to, or housed by, the structural system 420. For example, the structural system 420 may provide mechanical mounting and support for solar panels in the power system 424. The structural system 420 may also provide for thermal control to maintain components of the satellite 102 within operational temperature ranges. For example, the structural system 420 may include louvers, heat sinks, radiators, and so forth.

The control system 422 provides various services, such as operating the onboard systems, resource management, providing telemetry, processing commands, and so forth. For example, the control system 422 may direct operation of the communication system 428. The control system 422 may include one or more flight control processors 520. The flight control processors 520 may comprise one or more processors, FPGAs, and so forth. A tracking, telemetry, and control (TTC) system 522 may include one or more processors, radios, and so forth. For example, the TTC system 522 may comprise a dedicated radio transmitter and receiver to receive commands from a ground station 406, send telemetry to the ground station 406, and so forth. A power management and distribution (PMAD) system 524 may direct operation of the power system 424, control distribution of power to the systems of the satellite 102, control battery 534 charging, and so forth.

The power system 424 provides electrical power for operation of the components onboard the satellite 102. The power system 424 may include components to generate electrical energy. For example, the power system 424 may comprise one or more photovoltaic arrays 530 comprising a plurality of photovoltaic cells, thermoelectric devices, fuel cells, and so forth. One or more PV array actuators 532 may be used to change the orientation of the photovoltaic array(s) 530 relative to the satellite 102. For example, the PV array actuator 532 may comprise a motor. The power system 424 may include components to store electrical energy. For example, the power system 424 may comprise one or more batteries 534, fuel cells, and so forth.

The maneuvering system 426 maintains the satellite 102 in one or more of a specified orientation or reference orbit 104. For example, the maneuvering system 426 may stabilize the satellite 102 with respect to one or more axes. In another example, the maneuvering system 426 may move the satellite 102 to a specified reference orbit 104. The maneuvering system 426 may include one or more of reaction wheel(s) 540, thrusters 542, magnetic torque rods 544, solar sails, drag devices, and so forth. The thrusters 542 may include, but are not limited to, cold gas thrusters, hypergolic thrusters, solid-fuel thrusters, ion thrusters, arcjet thrusters, electrothermal thrusters, and so forth. During operation, the thrusters 542 may expend propellent. For example, an electrothermal thruster may use water as propellent, using electrical power obtained from the power system 424 to expel the water and produce thrust. During operation, the maneuvering system 426 may use data obtained from one or more of the sensors 430.

The satellite 102 includes one or more sensors 430. The sensors 430 may include one or more engineering cameras 550. For example, an engineering camera 550 may be mounted on the satellite 102 to provide images of at least a portion of the photovoltaic array 530. Accelerometers 552 provide information about acceleration of the satellite 102 along one or more axes. Gyroscopes 554 provide information about rotation of the satellite 102 with respect to one or more axes. The sensors 430 may include a global navigation satellite system (GNSS) 556 receiver, such as a Global Positioning System (GPS) receiver, to provide information about the position of the satellite 102 relative to Earth 106. In some implementations the GNSS 556 may also provide information indicative of velocity, orientation, and so forth. One or more star trackers 558 may be used to determine an orientation of the satellite 102. A coarse sun sensor 560 may be used to detect the sun, provide information on the relative position of the sun with respect to the satellite 102, and so forth. The satellite 102 may include other sensors 430 as well. For example, the satellite 102 may include a horizon detector, radar, lidar, and so forth.

The communication system 428 provides communication with one or more other devices, such as other satellites 102, ground stations 406, user terminals 408, and so forth. The communication system 428 may include one or more modems, digital signal processors, power amplifiers, antennas (including at least one antenna that implements multiple antenna elements, such as a phased array antenna), processors, memories, storage devices, communications peripherals, interface buses, and so forth. Such components support communications with other satellites 102, ground stations 406, user terminals 408, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 428 may be output to other systems, such as to the control system 422, for further processing. Output from a system, such as the control system 422, may be provided to the communication system 428 for transmission.

The communication system 428 may include hardware to support the intersatellite link 490. For example, an intersatellite link FPGA 570 may be used to modulate data that is sent and received by an ISL transceiver 572 to send data between satellites 102. The ISL transceiver 572 may operate using radio frequencies, optical frequencies, and so forth.

A communication FPGA 574 may be used to facilitate communication between the satellite 102 and the ground stations 406, UTs 408, and so forth. For example, the communication FPGA 574 may direct operation of a modem 576 to modulate signals sent using a downlink transmitter 578 and demodulate signals received using an uplink receiver 580. The satellite 102 may include one or more antennas 582. For example, one or more parabolic antennas may be used to provide communication between the satellite 102 and one or more ground stations 406. In another example, a phased array antenna may be used to provide communication between the satellite 102 and the UTs 408.

Figure 6:
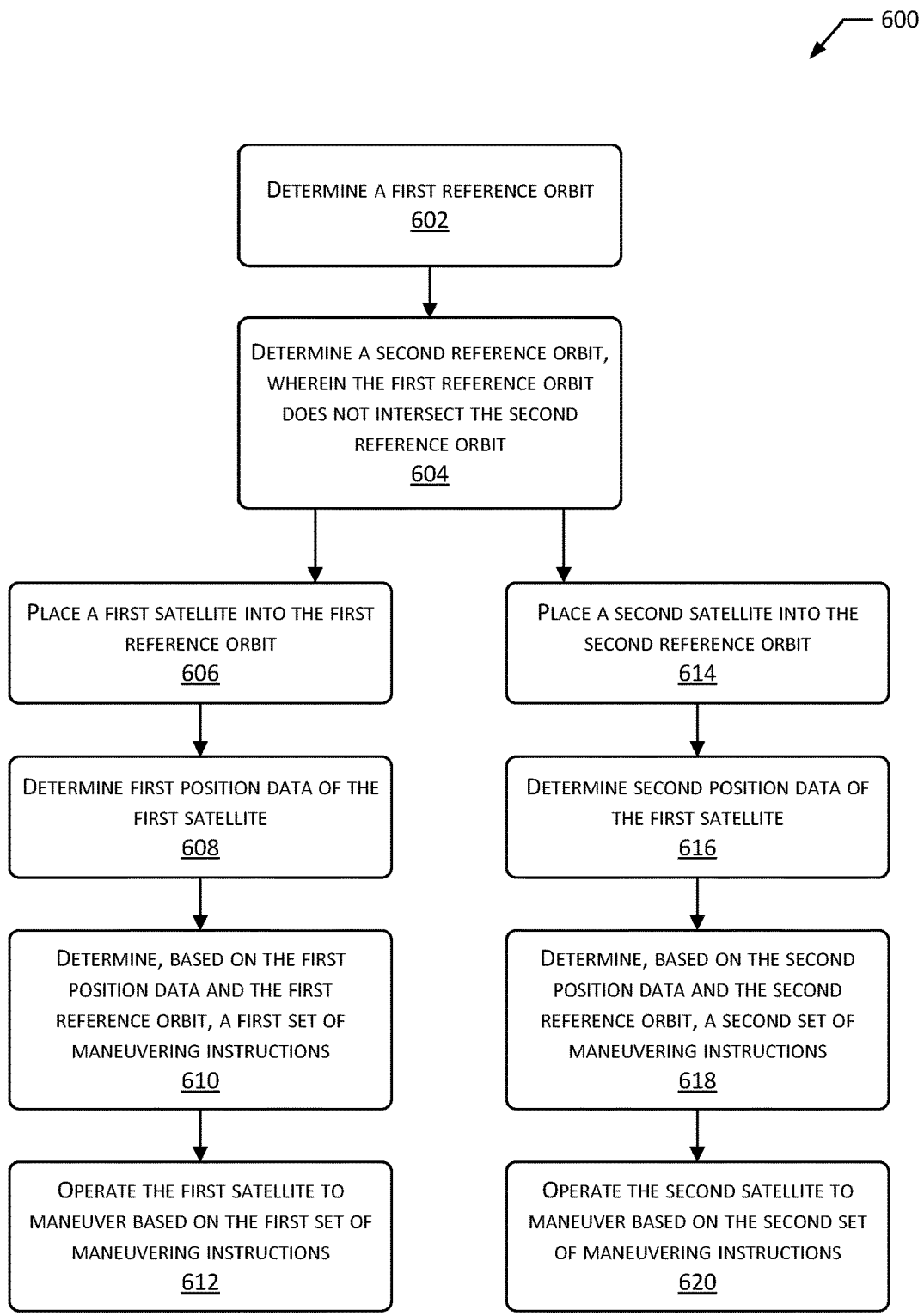
FIG. 6 illustrates a process of determining and maintaining orbits of a constellation that avoids endogenous collisions, according to some implementations.

FIG. 6 illustrates a process 600 of determining and maintaining orbits 404 of a constellation 108 that avoids endogenous collisions, according to some implementations. The process 600 may be implemented by one or more of the satellites 102, the management system 450, or other systems.

At 602 a first reference orbit 104(1), and the corresponding first set of orbital parameters 120(1), is determined. For example, the orbital mechanics system 452 may determine a first frozen orbit. A first reference orbit 104(1) may be defined relative to the first frozen orbit. In some implementations the first frozen orbit may be used as the first reference orbit 104(1). In other implementations one or more values 124 of the first frozen orbit may be modified to determine the first reference orbit 104(1). The first set of orbital parameters 120(1) may specify one or more of a first eccentricity value, a first argument of perigee value, or a first RAAN value.

At 604 a second reference orbit 104(2), and the corresponding second set of orbital parameters 120(2), is determined. The second set of orbital parameters 120(2) may specify one or more of a second eccentricity value, a second argument of perigee value, or a second RAAN value.

The second reference orbit 104(2) is also based on the first frozen orbit, and the second set of orbital parameters 120(2) define an orbit that does not intersect with the first reference orbit 104(1). In one implementation, the first argument of perigee value is within a first threshold value of a third argument of perigee of the frozen orbit. Likewise, the second argument of perigee value may be within the first threshold value of the third argument of perigee value. For example, the threshold value may correspond to the boundary of the quasi-stable region 306.

Because the first reference orbit 104(1) and the second reference orbit 104(2) are associated with the first frozen orbit and have reference orbit poles 304 that are within the quasi-stable region 306, they also exhibit behaviors of a frozen orbit. For example, the reference orbits 104 will have substantially the same altitude 112 above a geographic location 110 at a particular latitude of Earth 106.

Because the set of orbital parameters 120 for each reference orbit 104 is a unique combination of values 124 of orbital parameters 122, each reference orbit 104 will have a different altitude 112 at a given latitude. This difference in altitudes 112 produces the separation distance 114, eliminating the possibility of endogenous collision of satellites 102 within the constellation 108.

The variation between the reference orbits 104 may be expressed in another way. For example, the first set of orbital parameters 120(1) describes a first line of apsis 250(1). Continuing, the second set of orbital parameters 120(2) describes a second line of apsis 250(2). The first line of apsis 250(1) and the second line of apsis 250(2) are not coaligned.

An algorithm may be used to test various values 124 of orbital parameters 122 to determine a minimum distance between two orbits, providing an indication of the separation distance 114. In the following example, the influence of various orbital parameters 122 on the separation distance 114 is performed by searching along a mean anomaly of each orbit. This example is described with regard to Matlab as provided by Mathworks Inc. of Natick, Mass.

For this example, the following orbital parameters 122 and their corresponding values 124 are specified as followed:
Re=6378.137;
orbit_alt=590;
eccentricity=0.000583;
inclination=33;
deltaRAAN=12.8571429;
decc=0.00002;
ecc2=eccentricity+decc;
aop=90;
aop2=91.4;
sma=orbit_alt+Re;
Parameters 1

The first reference orbit 104(1) may be constructed as an eccentric orbit in the perifocal system, which is within the plane of the orbit with the X-Axis pointed to perigee 230, Y-Axis pointed to the orbit position such that true anomaly 240=90 degrees. To orient the first reference orbit 104(1) to its inertial keplerian definition, a series of rotation matrices are defined. The first rotation of the first reference orbit 104(1) is applied about the orbit normal (Perifocal Z-Axis) by the argument of perigee 232. The second rotation is about the X-axis by the value of inclination 220. The third rotation is about the original Z-Axis by the value of RAAN 210. This may be performed using Code Portion 1.

% Perifocal System: X axis to perigee, Y axis to true anomaly=90%
1st rotation matrix rot1 about Z by aop
cs1=cos(aop*pi/180);
ss1=sin(aop*pi/180);
cs12=cos(aop2*pi/180);
ss12=sin(aop2*pi/180);
rot1=[cs1 ss1 0; −ss1 cs1 0; 0 0 1];
rot12=[cs12 ss12 0; −ss12 cs12 0; 0 0 1];
% 2nd rotation matrix rot2 about X in inclination
cs2=cos(inclination*pi/180);
ss2=sin(inclination*pi/180);
rot2=[1 0 0; 0 cs2 ss2; 0 −ss2 cs2];
%3rd rotation matrix rot3 about Z by delta RAAN
cs3=cos(deltaRAAN*pi/180);
ss3=sin(deltaRAAN*pi/180);
rot3=[cs3 ss3 0; −ss3 cs3 0; 0 0 1];
Code Portion 1

Instead of defining the entirety of the first reference orbit 104(1) for the minimum separation search, an initial location for the closest approach may be used and seeded. A search is performed in both directions about the initial orbit position (nu1 and nu2), as shown in Code Portion 2.

% Set values for coarse initial search
% Algorithm will refine size and range to converge on closest approach
% nu1 and nu2 are true anomaly initial guesses for closest approach for
% orbit 1 and adjacent orbit 2.
% dnu1 and dnu2 are ½ search interval values.
nu1=0;
nu2=0;
dnu1=85;
dnu2=85;
minrange=10000;
n=3; % initial number of points in search range 1 & 2
epsilon=100; % convergence criteria
% Search for true closest approach. Start minimum search using coarse true
% anomalies for each orbit. Search locally near these true anomaly locations
% (searchrange 1 & 2).
formatSpec="minrange: % f nu1: % f nu2: % f dnu1: % f epsilon: % d"; while dnu1>0.0000001
prevminrange=minrange;
searchrange1=[(nu1−dnu1) nu1 (nu1+dnu1)];
searchrange2=[(nu2−dnu2) nu2 (nu2+dnu2)];
x1=zeros(n,3);
x2=zeros(n,3);
for i=1:1:n
r1=sma*(1−eccentricity^2)/(1+eccentricity*cos(searchrange1(i)*pi/180));
r2=sma*(1−ecc2^2)/(1+ecc2*cos(searchrange2(i)*pi/180));
Code Portion 2

The results may be converted from the perifocal system using Code Portion 3.
% Perifocal System: X axis to perigee, Y axis to true anomaly=90
x1p=r1*cos(searchrange1(i)*pi/180);
y1p=r1*sin(searchrange1(i)*pi/180);
z1p=0;
x2p=r2*cos(searchrange2(i)*pi/180);
y2p=r2*sin(searchrange2(i)*pi/180);
z2p=0;
% rotate the perifocal orbit about Z-axis by the value for Arg Perigee
X1=[x1p y1p z1p]*rot1;
X2=[x2p y2p z2p]*rot12;
% rotate the perifocal orbit about X-axis by the value for Inclination
X1=X1*rot2;
X2=X2*rot2;
% rotate the inclined orbit about Z-axis by the value for deltaRAAN
X2=X2*rot3;
x1(i,:)=X1;
x2(i,:)=X2;
end
Code Portion 3

The results may be produced by Code Portion 4.
for j=1:1:n
for k=1:1:n
range=norm(x2(k,:)−x1(j,:));
if (range<minrange)
minrange=range;
nu1=searchrange1(j);
nu2=searchrange2(k);
end
end
end
dnu1=dnu1/2;
dnu2=dnu2/2;
epsilon=sqrt((minrange−prevminrange)^2);
end
Code Portion 4

By using these code portions, and given the initial inputs, the data in Table 1 is determined. The data in Table 1 indicates the minimum separation distance 114 when comparing a first reference orbit 104(1) to a second reference orbit 104(2) in which several values 124 of the orbital parameters 122 have been varied.

TABLE 1

MINIMUM SEPARATION FOR 590 KM ORBITS
SEPARATED BY 12.85 DEG RAAN

| decc | daop (deg) | Minimum Separation (km) |
|---|---|---|
| 0 | 5 | 0.0486 |
| 0 | 10 | 0.1277 |
| 0 | 15 | 0.2365 |
| 0 | 20 | 0.3742 |
| 0.00001 | 0 | 0.0694 |
| 0.00005 | 0 | 0.3468 |
| 0.00010 | 0 | 0.6937 |
| 0.00015 | 0 | 1.0405 |
| 0.00050 | 0 | 3.4620 | decc is change in eccentricity relative to the first reference orbit 104(1).
daop is a change in argument of perigee 232 relative to the first reference orbit 104(2).

As shown in Table 1, a relatively small variation in the values 124 of the orbital parameters 122 results in a substantial separation distance 114, mitigating endogenous collision.

At 606 a first satellite 102(1)(1) is placed into the first reference orbit 104(1). For example, the first satellite 102(1)(1) may be launched from Earth 106 or repositioned from another orbit.

At 608 first position data 432(1) of the first satellite 102(1)(1) is determined. For example, the sensors 430 onboard the satellite 102(1)(1) may acquire the first position data 432(1).

At 610 based on the first position data 432(1) and the first set of orbital parameters 120(1) that are associated with the first reference orbit 104(1), a first set of maneuvering instructions 434(1) are determined.

At 612 the first satellite 102(1)(1) is operated to maneuver based on the first set of maneuvering instructions 434(1). The maneuver(s) may be configured to place the first satellite 102(1)(1) to within one or more of a first threshold value of the first eccentricity value, a second threshold value of the first argument of perigee value, or a third threshold value of the first RAAN value. For example, the maneuver(s) may result in the first satellite 102(1)(1) attaining a particular position within a first stationkeeping volume.

In some implementations maneuvering of the satellites 102 may be constrained to a certain portion of a reference orbit 104. For example, maneuvering may be prohibited while the satellite 102 is within ±15 of the argument of perigee 232. In some implementations, the portion of the reference orbit 104 that is excluded from maneuvering may be selected based on use of the satellite 102 to provide communication services. For example, during maneuvering the satellite 102 may be unable to provide communication services to the UTs 408. As a result, maneuvering may be limited to portions of the orbit that pass over areas in which those communication services are not needed, or over areas in which other satellites 102 are available to provide service in place of the maneuvering satellite 102.

At 614 a second satellite 102(2)(1) is placed into the second reference orbit 104(2). For example, the second satellite 102(2)(1) may be launched from Earth 106 or repositioned from another orbit.

At 616 second position data 432(2) of the second satellite 102(2)(1) is determined. For example, the sensors 430 onboard the satellite 102(2)(1) may acquire the second position data 432(2).

At 618 based on the second position data 432(2) and the second set of orbital parameters 120(2) that are associated with the second reference orbit 104(2), a second set of maneuvering instructions 434(2) are determined.

At 620 the second satellite 102(2)(1) is operated to maneuver based on the second set of maneuvering instructions 434(2). The maneuver(s) may be configured to place the second satellite 102(2)(1) to within one or more of a second threshold value of the second eccentricity value, a second threshold value of the second argument of perigee value, or a third threshold value of the second RAAN value. For example, the maneuver(s) may result in the second satellite 102(2)(1) attaining a particular position within a second stationkeeping volume.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of controlling satellites, the method comprising:
   determining a first set of orbital parameters comprising:
      a first eccentricity value,
      a first argument of perigee value, and
      a first right ascension of the ascending node (RAAN) value;
   determining a second set of orbital parameters comprising:
      a second eccentricity value,
      a second argument of perigee value, and
      a second RAAN value;
   placing a first satellite into a first orbit corresponding to the first set of orbital parameters, wherein the first orbit is a frozen orbit;
   placing a second satellite into a second orbit corresponding to the second set of orbital parameters, wherein the second orbit is a frozen orbit;
   determining first position data of the first satellite;
   determining second position data of the second satellite;
   determining a first set of maneuvering instructions based at least in part on the first position data and the first set of orbital parameters;
   determining a second set of maneuvering instructions based at least in part on the second position data and the second set of orbital parameters;
   based at least in part on the first set of maneuvering instructions, maneuvering the first satellite to within (i) a first threshold value of the first eccentricity value, (ii) a second threshold value of the first argument of perigee value, and (iii) a third threshold value of the first RAAN value; and
   based at least in part on the second set of maneuvering instructions, maneuvering the second satellite to within (iv) a fourth threshold value of the second eccentricity value, (v) a fifth threshold value of the second argument of perigee value, and (vi) a sixth threshold value of the second RAAN value.

2. The method of claim 1, wherein:
   the first orbit is at a first altitude above a first latitude;
   the second orbit is at a second altitude above the first latitude; and
   the first altitude and the second altitude are separated by at least a first distance.

3. The method of claim 1, wherein:
   the first orbit is at a first altitude above a first latitude, wherein the first latitude is between +75 degrees North and −75 degrees South,
   the second orbit is at a second altitude above the first latitude, and
   the first altitude and the second altitude are separated by at least a first distance.

4. The method of claim 1, further comprising:
   determining a third set of orbital parameters indicative of a frozen orbit, the third set of orbital parameters comprising:
      a third eccentricity value,
      a third argument of perigee value, and
      a third RAAN value;
   wherein:
      the first argument of perigee value is within a seventh threshold value of the third argument of perigee value; and
      the second argument of perigee value is within the seventh threshold value of the third argument of perigee value.

5. The method of claim 1, wherein:
   the first set of orbital parameters describe a first line of apsis,
   the second set of orbital parameters describe a second line of apsis, and
   the first line of apsis and the second line of apsis are not coaligned.

6. The method of claim 1, wherein the first satellite has a first time of perigee passage; and further comprising:
   placing a third satellite into the first orbit corresponding to the first set of orbital parameters, wherein the third satellite has a second time of perigee passage that is different from the first time of perigee passage.

7. The method of claim 1, wherein:
   the first set of orbital parameters are based on capabilities of a maneuvering system of the first satellite; and the second set of orbital parameters are based on capabilities of a maneuvering system of the second satellite.

8. A system comprising:
a first satellite in a constellation of satellites, the first satellite comprising:
a first set of sensors; and
a first maneuvering system;
a first control system to:
receive first position data acquired using the first set of sensors;
retrieve a first set of orbital parameters comprising:
a first reference orbit comprising:
a first eccentricity value,
a first argument of perigee value, and
a first right ascension of the ascending node (RAAN) value,
wherein a first altitude of the first satellite in the first reference orbit at a first latitude differs by at least a threshold distance from any other reference orbits used by the constellation; and
a first ti me of perigee passage,
determine, based on the first position data and the first set of orbital parameters, a first set of maneuvering instructions;
send to the first maneuvering system the first set of maneuvering instructions; and
wherein the first maneuvering system operates based on the first set of maneuvering instructions.

9. The system of claim 8, wherein the first latitude is between +75 degrees North and −75 degrees South.

10. The system of claim 8, wherein the first reference orbit and the other reference orbits comprise frozen orbits.

11. The system of claim 8, wherein:
the first reference orbit has a first line of apsis, and
a second line of apsis for any of the other reference orbits is not coaligned with the first line of apsis.

12. The system of claim 8, wherein the first time of perigee passage differs from a second time of perigee passage of a second satellite in the first reference orbit.

13. A method performed by a first satellite in a constellation of satellites, the method comprising:
determining first position data based on one or more sensors of the first satellite in the constellation;
retrieving a first set of orbital parameters comprising:
a first reference orbit of the constellation comprising:
a first eccentricity value,
a first argument of perigee value,
a first right ascension of the ascending node (RAAN) value,
wherein a first altitude of the first satellite in the first reference orbit at a first latitude differs by at least a first distance from any other reference orbits used by the constellation; and
a first time of perigee passage,
determining, based on the first position data and the first set of orbital parameters, a first set of maneuvering instructions; and
based on the first set of maneuvering instructions, maneuvering the first satellite to within a first threshold value of the first eccentricity value, a second threshold value of the first argument of perigee value, and a third threshold value of the first RAAN value.

14. The method of claim 13, wherein the first latitude is between +75 degrees North and −75 degrees South.

15. The method of claim 13, wherein the first reference orbit and the other reference orbits comprise frozen orbits.

16. The method of claim 13, wherein:
the first reference orbit has a first line of apsis, and
a second line of apsis for any of the other reference orbits is not coaligned with the first line of apsis.

17. The method of claim 13, wherein the first time of perigee passage differs from a second time of perigee passage of a second satellite in the first reference orbit.

18. The method of claim 13, further comprising:
determining the first set of orbital parameters based on capabilities of a maneuvering system of the first satellite.

19. The method of claim 13, further comprising:
determining a first portion of the first reference orbit that is within a fourth threshold value of the first argument of perigee value; and
wherein the maneuvering occurs within the first portion of the first reference orbit.

20. The system of claim 8, the first control system to:
determine a first portion of the first reference orbit that is within a threshold value of the first argument of perigee value; and
wherein the first maneuvering system operates, based on the first set of maneuvering instructions, within the first portion of the first reference orbit.

* * * * *

UNITED STATES PATENT AND TRADEMARK OFFICE
CERTIFICATE OF CORRECTION

| | |
|---|---|
| PATENT NO. | : 11,414,218 B1 |
| APPLICATION NO. | : 16/891932 |
| DATED | : August 16, 2022 |
| INVENTOR(S) | : Marco Concha |

It is certified that error appears in the above-identified patent and that said Letters Patent is hereby corrected as shown below:

In the Claims

Column 21, Lines 21-22, Claim 8:
Currently read:
 "reference orbits used by the constellation; and
a first ti me of perigee passage,"
When they should read:
 --reference orbits used by the constellation; and
 a first time of perigee passage,--.

Signed and Sealed this
Fourth Day of October, 2022

Katherine Kelly Vidal
*Director of the United States Patent and Trademark Office*